(12) United States Patent
Moriya et al.

(10) Patent No.: US 10,276,200 B2
(45) Date of Patent: Apr. 30, 2019

(54) MAGNETIC RECORDING MEDIUM

(71) Applicant: FUJI ELECTRIC CO., LTD., Kawasaki-shi (JP)

(72) Inventors: Tomohiro Moriya, Sendai (JP); Hitoshi Nakata, Sendai (JP); Hiroyasu Kataoka, Sendai (JP); Hiroto Kikuchi, Sendai (JP); Akira Furuta, Sendai (JP); Takehito Shimatsu, Sendai (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 142 days.

(21) Appl. No.: 15/336,965

(22) Filed: Oct. 28, 2016

(65) Prior Publication Data
US 2017/0047090 A1    Feb. 16, 2017

Related U.S. Application Data

(63) Continuation of application No. PCT/JP2015/005340, filed on Oct. 23, 2015.

(30) Foreign Application Priority Data

Oct. 28, 2014   (JP) ................. 2014-219203

(51) Int. Cl.
*G11B 5/66*   (2006.01)
*G11B 5/65*   (2006.01)
*G11B 5/73*   (2006.01)

(52) U.S. Cl.
CPC ................ *G11B 5/65* (2013.01); *G11B 5/732* (2013.01)

(58) Field of Classification Search
CPC ........ G11B 5/732; G11B 5/7325; G11B 5/738
See application file for complete search history.

(56) References Cited

U.S. PATENT DOCUMENTS

| | | |
|---|---|---|
| 2012/0113768 A1 | 5/2012 | Kanbe et al. |
| 2012/0307398 A1 | 12/2012 | Kanbe et al. |
| 2013/0040167 A1 | 2/2013 | Alagarsamy et al. |

FOREIGN PATENT DOCUMENTS

| | | | |
|---|---|---|---|
| JP | 02071424 A | * | 3/1990 |
| JP | 2001-148114 A | | 5/2001 |
| JP | 2002-025030 A | | 1/2002 |
| JP | 2003-036514 A | | 2/2003 |
| JP | 2009-252308 A | | 10/2009 |
| JP | 2010-118147 A | | 5/2010 |

(Continued)

OTHER PUBLICATIONS

English Abstract of JP02-071424, Japan, Watada et al., Mar. 1990, 1 pg.*

(Continued)

*Primary Examiner* — Holly C Rickman
(74) *Attorney, Agent, or Firm* — Venable LLP; Henry J. Daley; Kerri M. Patterson

(57) ABSTRACT

The purpose of the invention is to provide a magnetic recording medium in which the surface roughness of the magnetic recording layer can be reduced without deterioration of the magnetic properties of the magnetic recording layer. The magnetic recording medium of the present invention includes a substrate, a seed layer on the substrate, and a magnetic recording layer on the seed layer, wherein the seed layer contains Mn, Cr, and O, and has a spinel structure.

2 Claims, 4 Drawing Sheets

(56) References Cited

FOREIGN PATENT DOCUMENTS

| JP | 2011-146089 A | 7/2011 |
| JP | 2011-165232 A | 8/2011 |
| JP | 2014-056622 A | 3/2014 |
| WO | 2011/021652 A1 | 2/2011 |

OTHER PUBLICATIONS

English machine translation of Watada et al., JP 02-071424, pp. 1-2 (Year: 1990).*
Penoyer, "Automatic Torque Balance for Magnetic Anisotropy Measurements," The Review of Scientific Instruments, Aug. 1959, vol. 30, No. 9, pp. 711-714.
Chikazumi, "Physics of ferromagnetism vol. II," Shokabo Co., Ltd., pp. 10-21.
Vratislav et al., "Magnetic Structure of Cubic Spinels $Mn_xCr_{3-x}O_4$ (x = 1.0-1.6)," Journal of Magnetism and Magnetic Materials, 1977, vol. 5, Issue 1, pp. 41-50.
International Search Report in counterpart International Application No. PCT/JP2015/005340, dated Dec. 28, 2015.

\* cited by examiner

MAGNETIC RECORDING MEDIUM

CROSS-REFERENCES TO RELATED APPLICATIONS

This application is a continuation application of PCT Application No. PCT/JP2015/005340 under 37 Code of Federal Regulations § 1.53 (b) and the said PCT application claims the benefit of Japanese Patent Application No. 2014-219203, filed Oct. 28, 2014, which is hereby incorporated by reference wherein in its entirety.

BACKGROUND OF THE INVENTION

Field of the Invention

Some of constitutional examples of the present invention relate to a magnetic recording medium. In particular, some of constitutional examples of the present invention relate to a magnetic recording medium used in a hard disc magnetic recording device (HDD).

Description of the Related Art

Perpendicular magnetic recording system is adopted as a technique for increasing the magnetic recording density. A perpendicular magnetic recording medium at least comprises a non-magnetic substrate and a magnetic recording layer formed of a hard-magnetic material. Optionally, the perpendicular magnetic recording medium may further comprise: a soft-magnetic under layer playing a role in concentrating the magnetic flux generated by a magnetic head onto the magnetic recording layer; an interlayer for orienting the hard-magnetic material in the magnetic recording layer in an intended direction; a protective film for protecting the surface of the magnetic recording layer; and the like.

The magnetic recording layer of the perpendicular magnetic recording medium formed of a granular magnetic material has been proposed for the purpose of obtaining favorite magnetic properties. The granular magnetic material comprises magnetic crystal grains and a non-magnetic substance segregated to surround the magnetic crystal grains. Respective magnetic crystal grains in the granular magnetic material are magnetically separated from each other with the non-magnetic substance.

For the purpose of further increasing the recording density of the perpendicular magnetic recording medium, a need for reduction in the grain diameter of the magnetic crystal grains in the magnetic layer arises in recent years. On the other hand, the reduction in the grain diameter of the magnetic crystal grains leads to a decrease in thermal stability of the recorded magnetization (also referred to as signals). Thus, the magnetic crystal grains in the magnetic layer need to be formed of materials with higher magnetocrystalline anisotropies, in order to compensate the decrease in thermal stability due to the reduction in the grain diameter of the magnetic crystal grains. As the materials having the required higher magnetocrystalline anisotropies, $L1_0$ type ordered alloys have been proposed. Typical $L1_0$ type ordered alloys include FePt, CoPt, FePd, CoPd, and the like.

Various trial to improve the magnetic properties of the magnetic recording layer containing the $L1_0$ type ordered alloy by the layer formed under the magnetic recording layer has been made. For example, Japanese Patent Laid-Open No. 2011-165232 proposes a magnetic recording medium wherein the magnetic recording layer is formed on an interlayer containing MgO as a main component and one or more of additional oxides. In this proposal, a crystal grain diameter of the crystal grains in the interlayer is reduced and one magnetic crystal grain in the magnetic recording layer is formed on one crystal grain in the interlayer (hereinafter, referred to as "one-to-one formation"), thereby making it possible to improve separation among the magnetic crystal grains, to decrease exchange coupling, and to decrease dispersion of coercive force.

International Publication No. WO 2011/021652 proposes a magnetic recording medium in which a third interlayer consisting of MgO is formed on a second interlayer comprising Cr and at least one additional element selected from the group consisting of Ti, Mo, W, V, Mn and Ru, and then the magnetic recording layer is formed on the third interlayer. This proposal is based on the fact that the crystal grain diameter of the second interlayer is reduced by adding the additional element to the second interlayer. The reduction in the crystal grain diameter of the second interlayer leads to reduction in crystal grain diameter of the third interlayer consisting of MgO, thereby allowing the "one-to-one formation" between the third interlayer and the magnetic recording layer. Then, exchange coupling among the magnetic crystal grains and media noise can be reduced by the effect of the "one-to-one formation".

Japanese Patent Laid-Open No. 2011-146089 proposes a magnetic recording medium in which a seed layer consisting of amorphous ceramics such as $SiO_2$, an orientation controlling layer consisting of crystalline material such as MgO and $MnAl_2O_4$, and a magnetic layer comprising an FePt alloy as a main component are stacked in this order. In this proposal, improvement in crystalline orientation of the orientation controlling layer and miniaturization of the structure of the orientation controlling layer are made possible by disposing the seed layer consisting of amorphous ceramics. Then, prevention of disturbance in the crystalline orientation of the FePt alloy and miniaturization of grain diameter of the magnetic crystal grains in the magnetic layer leads to the magnetic recording layer having a high magnetic anisotropy constant Ku, excellent magnetic properties and excellent read-write characteristics.

When improvement in recording density of the magnetic recording layer is intended, one of factors to be considered is a distance between the magnetic recording layer and a magnetic head. Generally, the shorter distance between the magnetic recording layer and the magnetic head makes it possible to improve the recording density. On the other hand, the distance between the magnetic recording layer and the magnetic head must be larger than the surface roughness of the magnetic recording medium. If the surface roughness of the magnetic recording medium increases, the read-write characteristics of the magnetic recording medium may be deteriorated by undesirable influence of the surface roughness upon flying characteristics of the magnetic head. In the case of the conventional interlayer consisting of MgO, it is necessary to increase the substrate temperature to 400° C. or higher in order to achieve the desired surface roughness. Therefore, there is a need to reduce the surface roughness of the magnetic recording medium, especially the surface roughness of the magnetic recording layer.

SUMMARY OF THE INVENTION

Some of constitutional examples of the present invention aim to provide a magnetic recording medium in which the surface roughness of the magnetic recording layer can be reduced without adversely affecting the magnetic properties of the magnetic recording layer, such as the magnetic anisotropy constant Ku, the saturated magnetization Ms, and the squareness ratio Mr/Ms.

The magnetic recording medium described in the present specification comprises a substrate, a seed layer on the substrate, and a magnetic recording layer on the seed layer, wherein the seed layer contains Mn, Cr, and O, and has a spinel structure. Here, the seed layer may consist of $Mn(Mn_xCr_{1-x})_2O_4$ where $0 \leq x \leq 0.25$. Here, the magnetic recording layer may comprise an ordered alloy. Alternatively, the magnetic recording layer may have a granular structure consisting of magnetic crystal grains and a non-magnetic grain boundary which surrounds the magnetic crystal grains, wherein the magnetic crystal grains may comprise an ordered alloy, and the non-magnetic grain boundary may comprise a non-magnetic material selected from the group consisting of carbon, an oxide, and a nitride.

By adopting the above-described configuration, it becomes possible to obtain a magnetic recording medium having the seed layer having a small surface roughness, and the magnetic recording layer having a small surface roughness. Thus, the obtained magnetic recording medium contributes to excellent flying characteristics of the magnetic head.

Further features of the present invention will become apparent from the following description of exemplary embodiments (with reference to the attached drawings).

DESCRIPTION OF THE EMBODIMENTS

Figure 1:
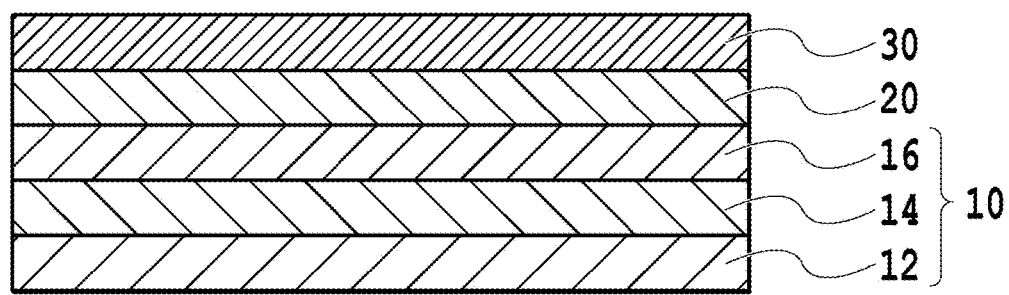
FIG. 1 is a schematic cross-sectional diagram showing a configuration example of the magnetic recording medium.

The magnetic recording medium according to one embodiment comprises a substrate, a seed layer on the substrate, and a magnetic recording layer on the seed layer, wherein the seed layer contains Mn, Cr, and O, and has a spinel structure. A configuration example of the magnetic recording medium is shown in FIG. 1. The magnetic recording medium shown in FIG. 1 has a structure in which substrate 10, seed layer 20, and magnetic recording layer 30 are stacked in this order, wherein the substrate 10 consists of non-magnetic support 12, adhesive layer 14, and interlayer 16.

The substrate 10 of this embodiment comprises the non-magnetic support 12. The substrate 10 may further comprise layers known in the art such as the adhesive layer 14, a soft-magnetic under layer, a heat-sink layer, and the interlayer 16, on the surface of the non-magnetic support on the side of the seed layer 20.

The non-magnetic support 12 may be various substrates having a flat surface. For example, the non-magnetic support 12 may be formed of material commonly used in magnetic recording media. The useful material comprises an NiP-plated Al alloy, monocrystalline MgO, $MgAl_2O_4$, $SrTiO_3$, tempered glass, crystallized glass, and the like.

The adhesive layer 14, which may be formed optionally, is used for enhancing the adhesion between the layer formed on it and the layer formed under it. The layer formed under the adhesive layer 14 includes the non-magnetic support 12. The material for forming the adhesive layer 14 comprises a metal such as Ni, W, Ta, Cr or Ru, or an alloy containing the above-described metals. The adhesive layer may be a single layer or have a stacked structure with plural layers. The adhesive layer 14 can be formed by any process known in the art, such as a sputtering method or a vacuum deposition method. In the present specification, the description "sputtering method" includes any technique known in the art, such as a DC magnetron sputtering method and an RF magnetron sputtering method.

The soft-magnetic under layer (not shown), which may be formed optionally, controls the magnetic flux emitted from a magnetic head to improve the read-write characteristics of the magnetic recording medium. The material for forming the soft-magnetic under layer includes: a crystalline material such as an NiFe alloy, a sendust (FeSiAl) alloy, or a CoFe alloy; a microcrystalline material such as FeTaC, CoFeNi or CoNiP; and an amorphous material including a Co alloy such as CoZrNb or CoTaZr. The optimum thickness of the soft-magnetic under layer depends on the structure and characteristics of the magnetic head used in magnetic recording. When forming the soft-magnetic under layer continuously with other layers, the soft-magnetic under layer preferably has a thickness in a range from 10 nm to 500 nm (both inclusive), in view of productivity. The soft-magnetic under layer can be formed by any process known in the art, such as a sputtering method or a vacuum deposition method.

A heat sink layer (not shown) may be provided when the magnetic recording medium of this embodiment is used as a magnetic recording medium for a heat-assisted magnetic recording system. The heat sink layer is a layer for effectively absorbing excess heat of the magnetic recording layer 30 that is generated during heat-assisted magnetic recording. The heat sink layer can be formed of a material having a high thermal conductivity and a high specific heat capacity. Such material includes a Cu simple substance, an Ag simple substance, an Au simple substance, or an alloy material composed mainly of these substances. As used herein, the expression "composed mainly of" means that the content of the concerned material is 50% by weight or more. In consideration of its strength or the like, the heat sink layer can be formed of an Al—Si alloy, a Cu—B alloy, or the like. Further, the heat sink layer can be formed of a sendust (FeSiAl) alloy, a soft-magnetic CoFe alloy, or the like, and thereby imparting the function of concentrating a perpendicular magnetic field generated by the head (that is, the function of the soft-magnetic under layer) to the heat sink layer. The optimum thickness of the heat sink layer depends on the amount and distribution of heat generated during heat-assisted magnetic recording, as well as the layer configuration of the magnetic recording medium and the thickness of each constituent layer. When forming the heat sink layer continuously with other constituent layers, the heat sink layer preferably has a thickness of 10 nm or more and 100 nm or less, in view of the productivity. The heat sink layer can be formed by any process known in the art, such as a sputtering method or a vacuum deposition method. Normally, the heat sink layer is formed by the sputtering method. The heat sink layer can be formed just under the adhesive layer 14, just under the soft-magnetic under layer, just under the seed layer 20, or the like, in consideration of properties required for the magnetic recording medium.

The interlayer 16, which may be formed optionally, is a layer disposed for blocking the influence of the crystalline structure of a layer formed under the interlayer 16 on the crystalline orientation, the size of the magnetic crystal grains and the like of the magnetic recording layer 30. Further, when the soft-magnetic under layer is provided, the interlayer 16 has to be non-magnetic. The material for forming the interlayer 16 includes a metal such as Cr or Ta, an NiW alloy, and Cr-based alloys such as CrTi, CrZr, CrTa, or CrW. The interlayer 16 can be formed by any process known in the art, such as a sputtering method.

Figure 2:
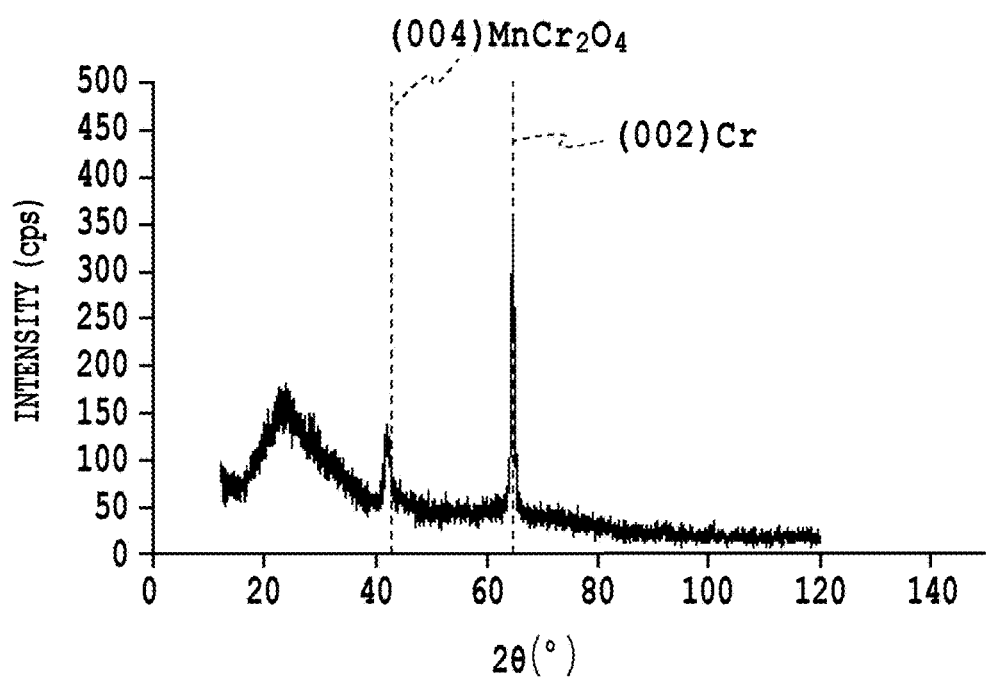
FIG. 2 is a graphical representation showing a result of X-ray diffraction analysis of the seed layer.

The seed layer 20 of this embodiment consists of Mn, Cr and O, and has a spinel structure. The seed layer 20 may be constituted from $Mn(Mn_xCr_{1-x})_2O_4$ having a spinel structure wherein x is 0 or more and 0.25 or less. More specifically, compounds represented by $Mn(Mn_xCr_{1-x})_2O_4$ are double oxide having a structure of $Mn^{II}O \cdot (Mn^{III}_xCr_{1-x})_2O_3$. Here, "$Mn^{II}$" represents Mn in an oxidation state of +2, and "$Mn^{III}$" represents Mn in an oxidation state of +3. In other words, the ratio of Mn:Cr in the compound of $Mn(Mn_xCr_{1-x})_2O_4$ is within the range from 1:1 (x=0.25) to 1:2 (x=0). When x has a value with in the above-described range, $Mn(Mn_xCr_{1-x})_2O_4$ has a spinel structure. The structure of the seed layer 20 is confirmed by an X-ray diffraction analysis. Specifically, as shown in FIG. 2, the presence of a diffraction peak of (004) $MnCr_2O_4$ having the spinel structure confirms that $Mn(Mn_xCr_{1-x})_2O_4$ has the spinel structure. In the X-ray diffraction analysis, a Cu Kα ray (λ=0.1548 nm) is used. In addition, θ in FIG. 2 designates an incident angle of the X-ray, and the position of the diffraction peak of (004) $MnCr_2O_4$ has been described in Vratislav S., Zajicek J., Jirak Z., Andresen A. F., J. Magn. Magn. Mater., 1977, Vol. 5, Issue 1, pp 0.41-50.

Besides, the seed layer 20 has a thickness of 5 nm or more and 20 nm or less, preferably 10 nm or more and 20 nm or less. By having the thickness within these ranges, it is possible to obtain $Mn(Mn_xCr_{1-x})_2O_4$ having excellent crystallinity and orientation. In the case where the magnetic recording layer 30 comprises an ordered alloy, ordering of the ordered alloy can proceed well to obtain the magnetic recording layer 30 having a large magnetic anisotropy constant Ku, large saturated magnetization Ms, and a large squareness ratio Mr/Ms.

The magnetic recording layer 30 of this embodiment may comprise an ordered alloy. The ordered alloy may be an alloy comprising at least one element selected from the group consisting of Fe and Co, and at least one element selected from the group consisting of Pt, Pd, Au and Ir. The preferable ordered alloy is an $L1_0$ type ordered alloy selected from the group consisting of FePt, CoPt, FePd, and CoPd. The more preferable ordered alloy is an FePt alloy having an $L1_0$ type ordered structure. The ordered alloy may further comprise at least one element selected from the group consisting of Ni, Mn, Cu, Ru, Ag, Au and Cr.

Alternatively, the magnetic recording layer 30 may have a granular structure comprising magnetic crystal grains and a non-magnetic grain boundary which surrounds the magnetic crystal grains. The magnetic crystal grains may comprise the above-described ordered alloy. The non-magnetic grain boundary may comprise at least one material selected from the group consisting of: an oxide such as $SiO_2$, $TiO_2$, and ZnO; a nitride such as SiN and TiN; carbon (C); and boron (B). For example, the non-magnetic grain boundary may comprise a mixture of carbon (C) and boron (B).

Alternatively, the magnetic recording layer 30 may consist of a plurality of magnetic layers. Each of the magnetic layers may have a non-granular structure or a granular structure. Further, the magnetic recording layer 30 may have an exchange-coupled composite (ECC) structure in which a coupling layer such as Ru is stacked between the magnetic layers. Besides, a second magnetic layer may be formed on the magnetic layer having the granular structure, as a continuous layer (CAP layer) which does not comprise the granular structure.

Optionally, the protective layer (not shown) can be formed on the magnetic recording layer 30. The protective layer can be formed of a material conventionally used in the field of magnetic recording media. Specifically, the protective layer can be formed of non-magnetic metal such as Pt or Ta, a carbon-based material such as diamond-like carbon, or silicon-based material such as silicon nitride. The protective layer may be a single layer or have a stacked structure. The stacked structure of the protective layer may be a stacked structure of two types of carbon-based material having different characteristics from each other, a stacked structure of metal and a carbon-based material, a stacked structure of two types of metal having different characteristics, or a stacked structure of metallic oxide film and a carbon-based material, for example. The protective layer can be formed by any process known in the art such as a sputtering method or a vacuum deposition method.

Further, optionally, the liquid lubricant layer (not shown) may be formed on the protective layer. The liquid lubricant layer can be formed of a material conventionally used in the field of magnetic recording media, for example, perfluoropolyether-based lubricants or the like. The liquid lubricant layer can be formed by a coating method such as a dip-coating method, a spin-coating method, or the like, for example.

The magnetic recording medium of this embodiment can be produced by a method comprising the steps of: preparing the substrate 10; depositing $Mn(Mn_xCr_{1-x})_2O_4$ where 0≤x≤0.25 onto the substrate 10 to form the seed layer 20; and forming the magnetic recording layer 30 onto the seed layer 20.

The first step of preparing the substrate 10 includes washing the non-magnetic support 12, forming the optional layers such as the adhesive layer 14, the soft-magnetic under layer, the heat-sink layer, and the interlayer 16, onto the surface of the non-magnetic support 12 over which the seed layer 20 will be formed.

The second step of forming the seed layer 20 includes depositing $Mn(Mn_xCr_{1-x})_2O_4$ onto the substrate 20. The deposition of $Mn(Mn_xCr_{1-x})_2O_4$ can be carried out by any method known in the art such as a sputtering method or a vacuum deposition method. When using the sputtering method, a single target comprising $Mn(Mn_xCr_{1-x})_2O_4$ can be used, or a target comprising MnO and a target comprising $(Mn_xCr_{1-x})_2O_3$ can be used. By this step, the seed layer 20 having a small surface roughness can be obtained, and, in turn, the magnetic recording layer 30 having a small surface roughness can be obtained.

The third step of forming the magnetic recording layer can be carried out by depositing the predetermined material by a sputtering method. When forming the magnetic recording layer 30 comprising the ordered alloy, it is possible to use target (s) comprising material (s) for forming the ordered alloy. More specifically, it is possible to use a target comprising elements constituting the above-described ordered alloy at the predetermined ratio. Alternatively, the magnetic recording layer 30 may be formed by using a plurality of targets each of which comprises a single element, and controlling the ratio among the elements by adjusting power applied to the respective targets. When forming the magnetic recording layer 30 having the granular structure, it is possible to use a target comprising the material for forming the magnetic crystal grains and the material for forming the non-magnetic grain boundary at the predetermined ratio. Alternatively, the magnetic recording layer 30 may be formed by using a target comprising the material for forming the magnetic crystal grains and a target comprising the material for forming the non-magnetic grain boundary, and controlling the ratio between the magnetic crystal grains and the non-magnetic grain boundary by adjusting power applied to the respective targets. Here, if the magnetic crystal grains are formed of the ordered alloy, it is possible to use a plurality of targets each of which comprises the element constituting the ordered alloy separately.

If the magnetic recording layer 30 comprises the ordered alloy, heating of the substrate is involved during formation of the magnetic recording layer 30. The substrate temperature in this situation is within a range from 300° C. to 450° C. By adopting the substrate temperature within this range, it is made possible to improve the degree of order of the ordered alloy in the magnetic recording layer 30.

EXAMPLES

Example 1

A chemically strengthened glass substrate having a flat surface (N-10 glass substrate manufactured by HOYA CORPORATION) was washed to prepare non-magnetic support 12. The washed non-magnetic support 12 was brought into a sputtering device. Then, Ta adhesive layer 14 having a thickness of 5 nm was formed by an RF magnetron sputtering method in Ar gas at a pressure of 0.20 Pa which uses a Ta target placed 180 mm apart from the substrate. The electric power applied to the target was 200 W.

Then, Cr interlayer 16 having a thickness of 20 nm was formed by an RF magnetron sputtering method in Ar gas at a pressure of 0.20 Pa which uses a Cr target placed 180 mm apart from the substrate, to obtain substrate 10. The electric power applied to the target was 600 W.

Then, to the substrate 10 was formed $MnCr_2O_4$ seed layer 20 having a thickness of 10 nm by an RF magnetron sputtering method in Ar gas at a pressure of 0.18 Pa which uses an $MnCr_2O_4$ target placed 240 mm apart from the substrate 10. The electric power applied to the target was 300 W. Further, the temperature of the substrate 10 was set to 25° C. (no heating) or changed in a range from 300° C. to 430° C.

Then, the stacked body in which the seed layer 20 had been formed was heated to a temperature of 350° C., and FePt magnetic recording layer 30 having a thickness of 10 nm was formed by an RF magnetron sputtering method in Ar gas at a pressure of 1.00 Pa which uses an $Fe_{50}Pt_{50}$ target placed 240 mm apart from the substrate 10. The electric power applied to the target was 300 W.

Finally, a protective layer (not shown) consisting of a Pt film having a thickness of 5 nm and a Ta film having a thickness of 5 nm was formed by an RF magnetron sputtering method in Ar gas at a pressure of 0.18 Pa which uses a Pt target and a Ta target, to obtain a magnetic recording medium. The substrate temperature during formation of the protective layer was room temperature (25° C.). The sputtering power during formation of the Pt film and the Ta film was 300 W.

The M-H hysteresis loops of the resultant magnetic recording media were measured with a PPMS apparatus (Physical Property Measurement System, manufactured by Quantum Design, Inc.). From the M-H hysteresis loops, saturated magnetization Ms, residual magnetization Mr, and a squareness ratio Mr/Ms were determined. Further, the magnetic anisotropy constant Ku of the obtained magnetic recording medium was determined by evaluating, with a PPMS apparatus, the dependence of spontaneous magnetization on the angle at which the magnetic field is applied. The methods described in the publications: R. F. Penoyer, "Automatic Torque Balance for Magnetic Anisotropy Measurement", The Review of Scientific Instruments, August 1959, Vol. 30, No. 8, pp. 711-714; and Soshin Chikazumi, "Physics of ferromagnetism Vol. II", Shokabo Co., Ltd., pp. 10-21 (NPL3) were used in determination of the magnetic anisotropy constant Ku. The results are shown in Table 1.

Further, a sample just after formation of the seed layer and a sample just after formation of the magnetic recording layer were drawn out to determine the arithmetic average roughness Ra of the seed layer and the magnetic recording layer. In the present specification, the arithmetic average roughness Ra was determined by AFM observation of a measurement area of 1 μm by 1 μm. The results are shown in Table 1.

Comparative Example 1

A magnetic recording media were obtained by repeating the procedure of Example 1, except that the $MnCr_2O_4$ target was substituted with an MgO target, and the applied electric power was changed to 500 W when forming the seed layer. In Table 1 were summarized the measurement results of the surface roughness of the seed layer and the magnetic recording layer, and the magnetic anisotropy constant Ku, the saturated magnetization Ms, and the squareness ratio Mr/Ms of the obtained magnetic recording media.

[Table 1]

TABLE 1

EFFECTS OF MATERIAL OF SEED LAYER AND FORMATION TEMPERATURE

| Example/ Material of Seed Layer | Formation Temperature of Seed Layer (° C.) | Arithmetic Average Roughness Ra (nm) | | Magnetic Anisotropy Constant Ku*1 (×10^7 erg/cm³) | Saturated Magnetization Ms*2 (emu/cm³) | Squareness Ratio Mr/Ms |
|---|---|---|---|---|---|---|
| | | Seed Layer | Magnetic Recording Layer | | | |
| Ex. 1/ $MnCr_2O_4$ | 25 | 0.26 | — | — | — | — |
| | 300 | 0.22 | 0.449 | 2.04 | 1020 | 0.96 |
| | 350 | 0.30 | 0.520 | 2.13 | 1049 | 0.96 |
| | 430 | 0.28 | — | — | — | — |

TABLE 1-continued

EFFECTS OF MATERIAL OF SEED LAYER AND FORMATION TEMPERATURE

| Example/ Material of Seed Layer | Formation Temperature of Seed Layer (° C.) | Arithmetic Average Roughness Ra (nm) Seed Layer | Arithmetic Average Roughness Ra (nm) Magnetic Recording Layer | Magnetic Anisotropy Constant Ku*[1] (×10⁷ erg/cm³) | Saturated Magnetization Ms*[2] (emu/cm³) | Squareness Ratio Mr/Ms |
|---|---|---|---|---|---|---|
| C. Ex. 1/ MgO | 300 | 1.59 | 0.893 | 2.20 | 1011 | 0.96 |
|  | 350 | — | 0.858 | 2.34 | 1048 | 0.95 |
|  | 430 | 0.38 | — | — | — | — |

*[1] $10^7$ erg/cm³ = 1 J/cm³
*[2] 1 emu/cm³ = 1 A/mm (Evaluation)

Figure 3:
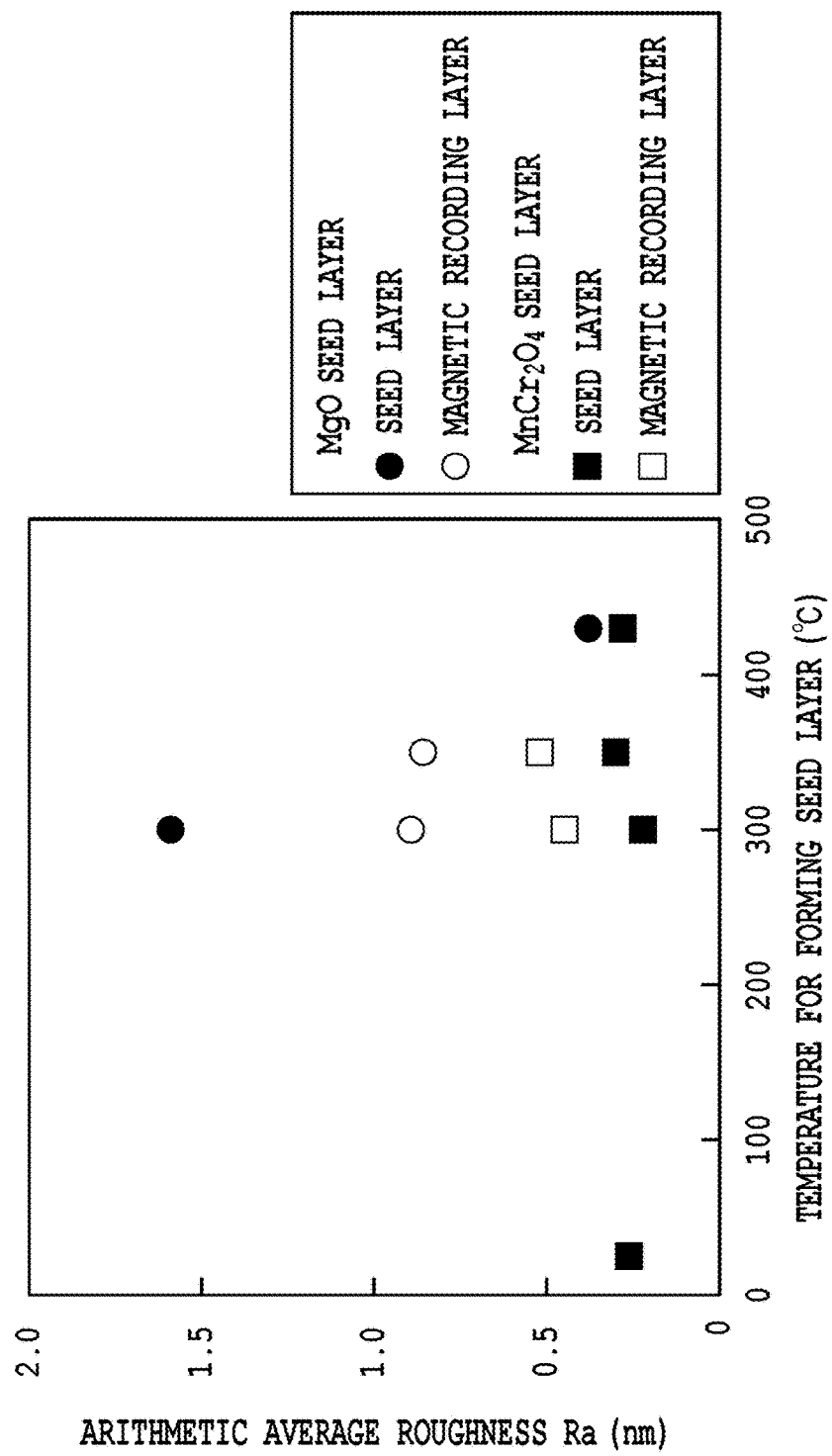
FIG. 3 is a graphical representation showing a relationship between the arithmetic average roughness Ra of the seed layer and the magnetic recording layer of the magnetic recording media obtained in Example 1 and Comparative Example 1, and the substrate temperature when forming the seed layer.

The relationship between the arithmetic average roughness Ra of the seed layer 20 and the magnetic recording layer 30 and the substrate temperature for forming the seed layer of the magnetic recording media obtained in Example 1 and Comparative Example 1 is shown in FIG. 3.

It is understood from FIG. 3 that the small arithmetic average roughness Ra is obtained in the cases where the seed layer 20 is formed of $MnCr_2O_4$ independently of the substrate temperature for forming the seed layer, whereas, in the cases where the seed layer 20 is formed of MgO, the arithmetic average roughness Ra decreases as the substrate temperature for forming the seed layer rises. Further, the arithmetic average roughness of both of the seed layer 20 and the magnetic recording layer 30 in the cases where $MnCr_2O_4$ is used is smaller than that in the cases where MgO is used. The magnetic recording layer 30 formed on the $MnCr_2O_4$ seed layer can achieve the arithmetic average roughness Ra of not greater than 0.7 nm which is desirable in view of flying stability of the head. In addition, the above-described results show that the seed layer 20 formed of $Mn(Mn_xCr_{1-x})_2O_4$ where $0 \leq x \leq 0.25$ exhibits similar effect to that of the seed layer 20 formed of $MnCr_2O_4$. Without intending to be limited by any theory, it is believed that growth of crystal grains is inhibited by deposition at a low temperature in the case of $MnCr_2O_4$ having a spinel structure.

Example 2

The substrate 10 was obtained by forming the Ta adhesive layer 14 having a thickness of 5 nm and the Cr interlayer 16 having a thickness of 20 nm onto the non-magnetic support 12, by means of the similar procedure to Example 1.

Then, to the substrate 10 was formed $MnCr_2O_4$ seed layer 20 having a thickness of 10 nm by an RF magnetron sputtering method in Ar gas at a pressure of 0.1 Pa which uses an $MnCr_2O_4$ target placed 166 mm apart from the substrate 10. The electric power applied to the target was 200 W. Further, the temperature of the substrate 10 was set to 430° C.

Then, the stacked body in which the seed layer 20 had been formed was heated to a temperature of 430° C., and FePt—C magnetic recording layer 30 having a thickness of 2 nm was formed by an RF magnetron sputtering method in Ar gas at a pressure of 1.5 Pa which uses an $Fe_{50}Pt_{50}$—C target placed 166 mm apart from the substrate 10. The content of C in the target was 40% by volume.

Further, the protective layer (not shown) consisting of a Pt film having a thickness of 5 nm and a Ta film having a thickness of 5 nm was formed by means of the procedure similar to Example 1, to obtain a magnetic recording medium.

Figure 4:
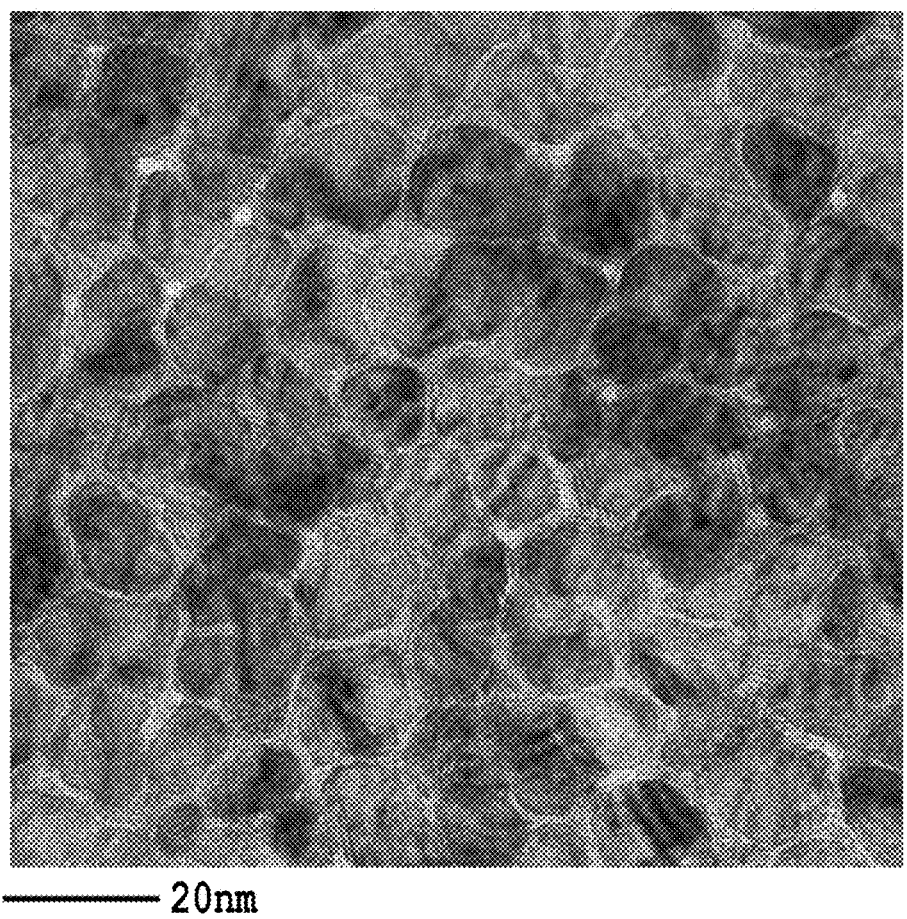
FIG. 4 shows an observed image of the surface TEM analysis of the magnetic recording medium obtained in Example 2.

The arithmetic average roughness Ra of the magnetic recording layer 30, and the saturated magnetization Ms and the magnetic anisotropy constant Ku of the magnetic recording medium were determined in accordance with the procedure similar to Example 1. Further, coercive force Hc and α value of a hysteresis loop were determined based on the M-H hysteresis loop obtained in the above procedure. The phrase "α value of a hysteresis loop" means a slope of the magnetization curve in the vicinity of a coercive force (H=Hc), and calculated by the equation of $\alpha = 4\pi \times (dM/dH)$. When determining the α value, a unit "emu/cm³" is used as the unit of M, and a unit "Oe" is used as the unit of H. The α value increases if the magnetic crystal grains in the granular structure are not magnetically separated well. On the other hand, the α value decreases if the magnetic properties of the magnetic crystal grains vary greatly, in such a case where crystal grains due to secondary growth are present. The α value is preferably in a range of 0.75 or more and less than 3.0, and more preferably in a range of 0.9 or more and less than 2.0. The measurement results are shown in Table 2. Further, it was confirmed that the magnetic recording layer 30 had the granular structure, by surface transmission electron microscopy (TEM). The observed image of the surface TEM is shown in FIG. 4.

Comparative Example 2

A magnetic recording medium was obtained by repeating the procedure of Example 2 except that the seed layer consisting of MgO was formed. The conditions for forming the seed layer was the same as those of Example 2 except that an MgO target was used instead of $MnCr_2O_4$ target. The arithmetic average roughness Ra of the magnetic recording layer 30, and the saturated magnetization Ms, the magnetic anisotropy constant Ku, the coercive force Hc, and the α value of the hysteresis loop of the magnetic recording medium were determined similarly to Example 2. The measurement results are shown in Table 2.

TABLE 2

MAGNETIC PROPERTIES OF MAGNETIC RECORDING MEDIUM COMPRISING MAGNETIC RECORDING LAYER OF GRANULAR STRUCTURE

| Example/ Material of Seed Layer | Arithmetic Average Roughness Ra (nm) | Coercive force Hc[*1] (kOe) | α Value of Hysteresis Loop | Saturated Magnetization Ms[*2] (emu/cm$^3$) | Magnetic Anisotropy Constant Ku[*3] (×10$^7$ erg/cm$^3$) |
|---|---|---|---|---|---|
| Ex. 2/ MnCr$_2$O$_4$ | 0.26 | 1.7 | 1.5 | 523 | 0.80 |
| C. Ex. 2/ MgO | 0.39 | 2.2 | 0.71 | 486 | 0.90 |

[*1] 1 kOe = 79.6 A/mm
[*2] 1 emu/cm$^3$ = 1 A/mm
[*3] 10$^7$ erg/cm$^3$ = 1 J/cm$^3$ It is understood from the results shown in Table 2 that the seed layer 20 consisting of MnCr$_2$O$_4$ is effective in reducing the arithmetic average roughness Ra of the magnetic recording layer 30 having the granular structure. Further, the magnetic recording medium of Example 2 having the seed layer 20 consisting of MnCr$_2$O$_4$ has similar properties to those of the magnetic recording medium of Comparative Example 2 having the MgO seed layer, in regard to the coercive force Hc, the saturated magnetization Ms, and the magnetic anisotropy constant Ku. On the other hand, the magnetic recording medium of Example 2 has the α value of hysteresis loop larger than that of Comparative Example 2. This result shows that the magnetic crystal grains in the granular structure are magnetically separated well in Example 2. Besides, it is understood from the image of the surface TEM analysis shown in FIG. 4 that the magnetic crystal grains in the magnetic recording layer are well separated in Example 2.

Example 3

A magnetic recording media were obtained by repeating the procedure of Example 1, except that the substrate temperature was fixed to 350° C. and the thickness of the seed layer 20 was changed, during formation of the seed layer 20. The thickness of the seed layer 20 and the measurement result of the magnetic anisotropy constant Ku of the resultant magnetic recording media are shown in Table 3.

TABLE 3

EFFECT OF THICKNESS OF SEED LAYER

| Thickness of Seed Layer (nm) | Magnetic Anisotropy Constant Ku[*1] (×10$^7$ erg/cm$^3$) |
|---|---|
| 2 | 0.364 |
| 5 | 1.78 |
| 10 | 3.09 |

[*1] 10$^7$ erg/cm$^3$ = 1 J/cm$^3$

As apparent from Table 3, the magnetic recording media having the large magnetic anisotropy constant Ku were obtained by setting the thickness of the seed layer to 5 nm or more.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A magnetic recording medium comprising a substrate, a seed layer on the substrate, and a magnetic recording layer on the seed layer, wherein the seed layer contains Mn, Cr, and O, and has a spinel structure, the seed layer has a thickness of 5 nm or more and 10 nm or less, the magnetic recording layer has a granular structure consisting of magnetic crystal grains and a non-magnetic grain boundary which surrounds the magnetic crystal grains, the magnetic crystal grains comprise an ordered alloy, the non-magnetic grain boundary comprises a non-magnetic material selected from the group consisting of carbon, an oxide, and a nitride, and the magnetic recording layer has an arithmetic average roughness of not greater than 0.7 nm.

2. A magnetic recording medium comprising a substrate, a seed layer over the substrate, and a magnetic recording layer over the seed layer, wherein the seed layer consists of Mn(Mn$_x$Cr$_{1-x}$)$_2$O$_4$ where 0≤x≤0.25, the seed layer has a thickness of 5 nm or more and 10 nm or less, the magnetic recording layer has a granular structure consisting of magnetic crystal grains and a non-magnetic grain boundary which surrounds the magnetic crystal grains, the magnetic crystal grains comprise an ordered alloy, the non-magnetic grain boundary comprises a non-magnetic material selected from the group consisting of carbon, an oxide, and a nitride, and the magnetic recording layer has an arithmetic average roughness of not greater than 0.7 nm.

* * * * *